United States Patent Office 2,784,965
Patented Mar. 12, 1957

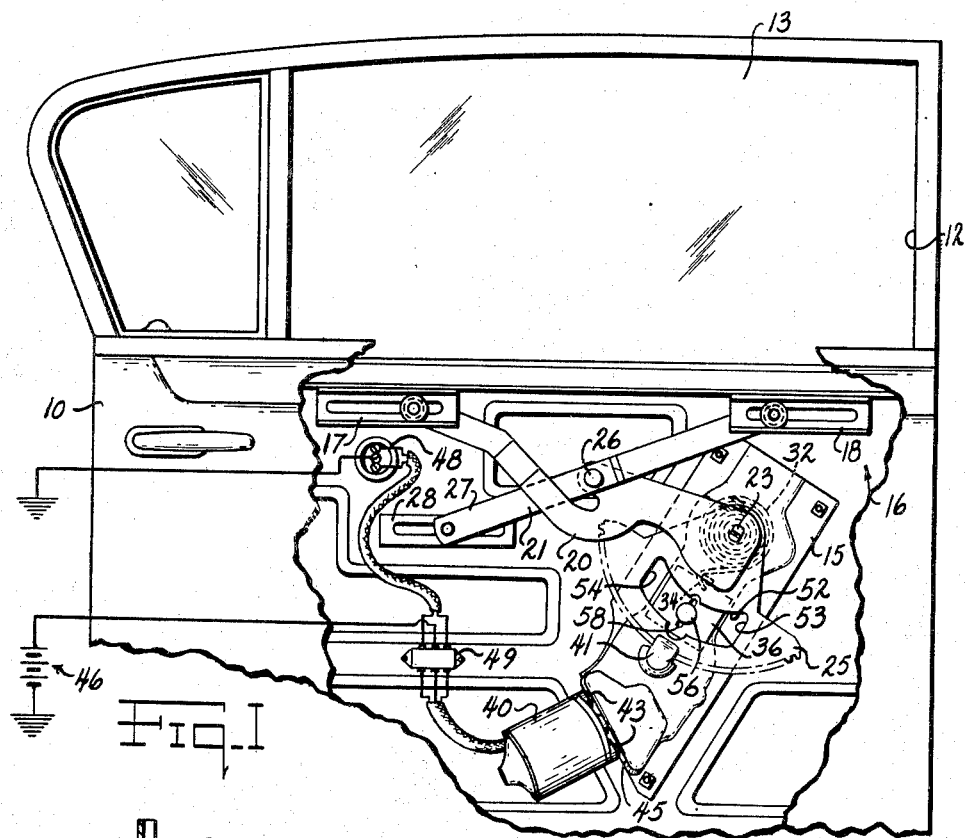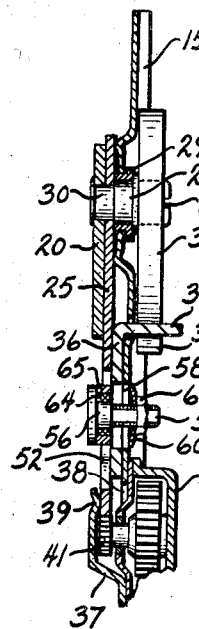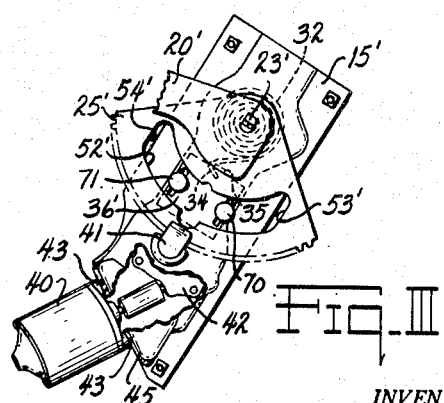

2,784,965

WINDOW ENCLOSURE ACTUATING MECHANISM

Albert J. Graumlich, Sylvania, and Dale W. Toms, Toledo, Ohio

Application April 24, 1953, Serial No. 350,858

7 Claims. (Cl. 268—124)

This invention relates to control mechanisms for shifting an element to selected positions along a predetermined path by the power of a motor under a simple manual control, and more particularly to a mechanism for moving and accurately placing a window pane of an automobile into its open or closed positions.

The invention comprehends a self-integrated, noiseless mechanism of light weight for moving the window pane of a motor vehicle and accurately locating the same in predetermined position without introducing high stresses to the supporting structure or to the window frame.

The invention comprises a power-operated unitary assembly for moving a part between selected positions including component parts of said assembly operable to stop the motion of the power means when the part reaches the end of its allowable travel and wherein objectionable noises and stresses are reduced to a minimum.

The invention contemplates a window-operating mechanism actuated by an electric motor of low deceleration torque including integrated means operable to stall the motor for limiting the extent of movement of the window, providing thereby a rugged unitary assembly of light weight for effectively positioning the window without subjecting the window assembly or its supporting means to high stresses.

The invention embraces a very quiet, self-integrated power-operated mechanism for a window, including adjustable means operable to regulate the extent of movement of the driving mechanism to thereby compensate not only for inaccuracies of manufacture but to permit its use with windows of relatively different types.

The invention includes an organization and arrangement of parts for a power mechanism for moving a window that will permit its installation without requiring reinforcement in the supporting structure, or in the means contacted by the window at the end of its allowable travel.

Prior to the present invention the electrically operated mechanisms for actuating automobile windows in which the motor is stalled when the window reaches the end of its travel have been of special character to meet specific installations. The types that found commercial acceptance require parts made of heavy gauge metals producing an assembly of considerable weight which requires reinforcement for the body or door panels or special structures in order to withstand the high reaction force caused by the deceleration torque and kinetic energy of rotation of the moving parts which must be rapidly dissipated due to the stalling of the motor when the window reaches its open or closed positions. However, irrespective of such reinforcements and special supporting structures, the high reaction force, due to the stalling of the motor, was readily manifested by distortion of the body and door panels or window assembly as well as its enclosing frame. The present invention overcomes and successfully cures the foregoing listed drawbacks by providing a mechanism wherein means for limiting the extent of movement of the window are inherently incorporated and thereby the use of heavy gauge metal for the component parts is not necessary, so that a light-weight assembly, having relatively low moment of inertia is produced and reinforcements or special supporting structures are not essential.

According to the foregoing summary of the invention, indicating the general nature and substance, its main objective is to provide a mechanism in which an electric motor of small size and low deceleration torque is connected to a window operating mechanism which has self-integrated stop or motion-limiting means for the operating gear to positively establish the ends of its allowable travel for accurately locating the window in its open or closed position.

Another object of the invention is the provision in a window-operating mechanism of an electric motor of small size having low deceleration torque and small kinetic energy of rotation of the armature and parts rotated thereby, so that the motor can be stalled or stopped by bringing into engagement component parts of the mechanism when the window reaches the ends of its allowable travel, so that the use of supporting structures, complex adjustments, and the necessity of limit switches is dispensed with.

Another object of the invention is to provide a self-integrated window actuating mechanism wherein, by a limited lost motion connection between a driving gear and a stationary member, the end positions of the window are positively established without introducing high stresses to the supporting structure or to the members actuating the window.

Another object of the invention is to provide, in a unitary power operated assembly for shifting a part between selected positions having means for positively stopping the power source to establish the end positions of the part whereby reduction of the weight of the component parts of the assembly is readily obtained without sacrificing the safety factor required for service conditions or the life expectancy of the assembly.

Another object of the invention is to provide a power-operated window actuating mechanism which does not require the use of metals of special physical properties having comparatively high cost for the manufacture of its component parts but permits the utilization of low cost metals without decreasing the sturdiness required for the effective performance of the mechanism under severe service conditions.

Another object of the invention is to provide a self-integrated window actuating mechanism incorporating means for limiting the travel of an oscillatory member with respect to its mounting plate by the use of a pin and slot connection, the length of which is chosen to establish the end positions of the swinging member and wherein means are provided to cause relative motion of the pin with respect to the slot to effect a fine degree of adjustment.

A further object of the invention is the provision of a unitary window actuating mechanism for automobile windows wherein means to limit the allowable travel of the window is obtained by causing abutting engagement between a movable and a relatively stationary member, the latter being displaceable for effectively modifying the extent of travel of the movable member.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is a front elevation of an automobile door with portions broken away to show the invention applied thereto;

Fig. II is a vertical sectional view of the mechanism shown in Fig. I;

Fig. III is a plan view of another form of a self-integrated power-actuated mechanism of the invention.

The invention may be incorporated in any type of apparatus used for moving a part to selected positions and for practical application of its principles the same is illustrated in the drawings as embodied in a window or closure actuating mechanism using a reversible electric motor as the power means. However, it is to be understood that the invention is not limited to the particular form illustrated, and that it is contemplated to use the same with any other suitable power-transmitting means and whenever the invention may be found to have utility.

Referring to the drawings which illustrate the self-integrated power transmitting unit of the invention as a mechanism for raising or lowering a window of an automobile, in Fig. I is shown a door 10 having a window of the non-draft ventilating type. The front portion 12 of the window opening is adapted to be spanned and closed by a vertical slidable transparent panel or window pane 13 which is mounted for reciprocatory movement within the window opening in vertically disposed guideways or channels and is adapted to be lowered into the usual well formed at the lower section of the door 10, within which is also housed the window-operating mechanism of the invention. In the embodiment shown, the window-operating mechanism, including the window regulator, forms a unitary assembly carried by an embossed supporting base-plate 15 detachably secured to the inner door frame or panel 16 by suitable means.

The window pane or closure 13, which is shown in window-closing position, is formed of glass or any other suitable transparent material, supported on a channel member provided with horizontally disposed spaced metallic guide members 17 and 18. The guide members are formed with elongated slots to receive the top studs or rollers of a window regulator forming the parallelogram action for moving the window pane 13 preventing its cocking or binding in the vertical guides of the frame-work of the window. The invention is shown in connection with a conventional regulator of the cross-arm type but it will be understood that it is also applicable to other types of regulators.

The window regulator shown comprises a pair of centrally interconnected pivoted arms 20 and 21 of substantially the same length. The power arm 20 is mounted for pivotal movement at its lower end on suitable pivot means 23 supported on base plate 15 and is secured to a gear member or sector 25. The balance arm 21 crosses the power arm 20 as it is pivoted substantially at the midpoint 26 of the power arm and has its lower extremity 27 connected to a slotted bracket forming a channel-shaped guideway 28 secured to the door or body panel 16.

The cross arms 20 and 21 of the window regulator are operated in unison to move the window pane or closure 13 up or down by motion imparted to the power arm 20 through the segmental gear or sector 25. The power arm 20, see Fig. II, and gear sector 25 are directly connected for rotary motion together about the axis of the pivot or stud 23 journaled on a suitable bearing 29 carried by the base-plate 15. The stud 23 has a reduced portion 30, fixedly secured to both the power arm 20 and gear sector 25 and is provided at its other end with a transverse slot 31 adapted to receive the inner end of the counter balance spring 32 having its outer end 34 in abutting engagement with the right angle disposed lug 35 formed at one end of the stationary reinforcing plate 36 which, in turn, is secured to the front face of the base-plate 15. The segmental gear 25 is rotated to swing the power arm 20 and actuate thereby the balance arm 21 to move the window by the prime mover of the invention which is here shown as a small high speed electric motor 40 adapted to drive the pinion 41 meshing the gear sector 25 through a transmission unit having speed reduction means suitably coupled to the motor shaft.

As particularly shown in Fig. II, the front surface of the embossed portion of the base-plate 15 is provided adjacent its lower portion with a struck-up truncated conical section 37 providing an opening 38 partially covered by a depending offset tongue 39 forming thereby an enclosing hood substantially covering the meshing engagement of the gear teeth of the output member or pinion 41 of the transmission unit and of the gear sector 25. The offset tongue 39 is arranged to bear against the front face of the gear sector 25 to guide the same in proper meshing with pinion 41, insuring parallel relation between the planar section of the base-plate 15 and that of the gear sector 25.

The transmission unit providing the means through which the motor shaft is connected to the gear sector 25 in a speed-reducing relationship including the non-reversible torque-transmitting gears is in the form of a sealed subassembly constituting the gear box 42 of which the driving pinion forms its output member and is provided with an outwardly projecting rotary member or input shaft adapted to be connected to the motor shaft.

The gear box 42 is detachably mounted by suitable means to the rear surface of the base-plate 15 while the motor 40 is resiliently mounted by means of suitable vibration-proof members 43 upon a depending flange 45 forming an integral part of the base-plate 15, providing thereby very effective means for securing proper alignment between the external portion of the input shaft of the gear box and the motor shaft, as well as means to compensate for misalignment and tolerances of manufacture. The prime mover or electric motor 40 is preferably of the reversible split field type adapted to be energized by the automobile storage battery 46 being manually controlled by a reversing switch 48, accessible to the driver, which operates the motor-reversing relays 49 suitably connected to the motor circuits.

To fulfill one of the objectives of the invention, the electric motor 40 is designed to provide the proper speed-torque characteristics for operating the window pane 13 through the speed reduction gear unit 42 by the use of an armature having a very low polar moment of inertia. The main objective in the motor design is to provide the desired speed and stalling torque characteristics by using an armature which has low deceleration torque and small kinetic energy of rotation whereby the armature can be stalled or stopped by the self-integrated motion-limiting means of the invention which positively establishes the end of the allowable travel of the segmental gear 25 as will be hereinafter described. The type of armature contemplated which incorporates very low polar moment of inertia and the stalling characteristics is obtained by reducing, to a minimum, its diameter, decreasing its peripheral mass, and using maximum magnetic tooth densities, especially at those sections adjacent its outer surface.

A novel feature of the invention resides in the provision of means operable to accurately position the window pane 13 in its open and closed position by stalling the electric motor 40 through the use of the abutting engagement of relatively movable parts of the driving mechanism which automatically stops their relative motion. By this arrangement, the window-moving mechanism and the window-enclosing frame are not subjected to objectionable stresses and self-integrated window-actuating mechanism is provided. In carrying the invention to practice, the means provided to allow a predetermined movement and thereafter stop the relative movement of the component parts of the window driving mechanism are preferably in the form of a limited lost motion connection between one of the driving members and a relatively stationary structure, preferably between a driving gear for the power arm and its supporting base-plate. It is contemplated that such limited lost motion connection determines the extent of travel of the sector and establishes its end position in either direction, which positions, in turn, are arranged to correspond to the open and closed positions of the window pane 13.

In the embodiment illustrated in Fig. I, the lost motion connection, which serves to stall the electric motor 40 after a predetermined movement occurs, takes the form of a pin and slot connection between the rotatable gear sector 25 and the stationary base-plate 15. In the form shown, the body of the sector adjacent its toothed section is formed with an arcuate slot 52 of appreciable width having substantially parallel transverse walls 53 and 54 which are adapted to be brought into direct abutting engagement with a pin mounted in the base-plate 15. As illustrated, the pin is in the form of a detachable threaded stud or bolt 56 mounted on the base-plate by having its threaded shank 57 passing through suitable aligned opening 58 provided in both the reinforcing members 36 and base-plate 15. The stud 56 is held in position by means of an anchoring washer 60 urged into frictional engagement with the rear surface of the base-plate 15 by means of the clamping member or threaded nut 62.

In the form of the invention illustrated the extent of travel of the window pane 13 to its open or closed position is controlled by the spacing of the abutments or transverse walls integrally provided on the gear sector 25 which corresponds to the ends of the slot 52. Therefore, the effective length of the slot is so arranged that upon a predetermined movement of the sector either of the transverse walls 53 or 54 are brought into direct engagement with the upper section of the stud 56. Thus it can be seen that the spacing of the abutment walls and, therefore, the length of the slot positively establishes the end position of the sector 25 as well as the window pane 13 by causing the stalling of the motor 40 through its direct engagement with the stud 56. In order to accurately locate the window pane 13 in either its open or closed positions, and thereby compensate for inaccuracies and tolerances of manufacture, means are provided to effect a fine degree of adjustment for setting the end positions of the sector 25. In the embodiment shown, these means are accomplished by enabling the pin or stud 56 to be displaced with respect to the base-plate 15. For such purpose, the opening 58 provided in both the reinforcing member 36 and the base-plate 15 is in the form of an enlongated slot of suitable dimensions to allow the stud to be shifted the entire width of the arcuate slot 52, so that as the stud can be moved for purposes of adjustment from its extreme outward position toward the pivotal point of the sector to change the extent of its effective travel, and thereby control the end positions of the sector 25. The displacement of the stud 56 with respect to the stationary base-plate 15 can be readily carried out by manipulating the clamping member or threaded nut 62.

In order to avoid the possibility of objectionable noise and provide a cushioning stop for stalling the motor, the stud 56 adjacent its top section is provided with suitable cushioning means, preferably in the form of a nylon bushing 64 surrounded by metallic ring 65. By this arrangement, the shock and stresses of engagement produced by the stalling of the motor are effectively cushioned, and any objectionable noises caused thereby are substantially dampened, so that a noiseless, self-integrated mechanism is readily provided.

It should be noted that by the provision of the arcuate slot 52 on the body of the sector 25, not only its weight is materially reduced but very effective motion-limiting means for stalling the electric motor are provided, so that by such simplified expedient the window pane is accurately located in either its open or closed position without the necessity of limit switches or complex adjusting mechanisms. Moreover, the stalling of the electric motor of the invention, by limiting the motion of the gear sector, does not require the use of heavy gauge sections of metals of special physical properties having comparatively high cost for the component members of the regulator but permits the utilization of light gauge sections of low-cost metals without decreasing the strength required for effectively sliding the window between its open and closed positions.

It can be seen from the foregoing that it only will be necessary for the automobile driver to actuate switch 48 to closed circuit positions to impart the desired movement of the window pane 13 by causing the energization of the electric motor 40 to rotate the driving pinion 41 to operate the sector 15 and swing the power arm 20 to move the window pane 13 toward the desired open or closed position. The movement of the window pane 13 will be stopped when either of the transverse walls 53 or 54 of the arcuate slot 52 are urged into contacting engagement with the stud 56 which stalls the motor and automatically stops further movement of the sector 25. In order to retain the window pane 13 in either its closed or open position after the electric motor 40 has been stalled, it will only be necessary for the automobile driver to release the switch, whereby the energization of the motor 40 from the batery 46 is interrupted. In the form of the invention shown, the actual energization of the motor is carried out through the operation of the relays 49 which are housed as a unit supported within the window well adjacent to the motor 40.

In the form of the invention shown in Fig. III, the self-integrated power mechanism includes means to provide a wide range of adjustments which are operable to independently establish the end positions of the sector and thereby locate, with a fine degree of accuracy, the window pane in its open or closed positions. Moreover, the arrangement shown not only provides means to compensate for inaccuracies of manufacture but permits the mechanism to be used with window installations of relatively different sizes providing a power mechanism of wide useful range, capable of satisfying the requirements of several automobile installations. In this form of the invention, the base-plate 15' forms the supporting structure for the window shifting arm 20' which is actuated by the pivotally-mounted gear sector 25' driven by the pinion 41' coupled to the electric motor 40' through the gear reduction unit 42'. The gear sector 25' in this modified form is also provided with an arcuate slot 52' of ample width having parallel transverse walls 53' and 54'. The transverse wall 53' of the slot 52' of the sector 25' is adapted to be urged into engagement with the stud 70 adjustably mounted on the reinforcing member 36' and base-plate 15', while the transverse wall 54' of the slot is adapted to be urged into engagement with the stud 71 adjustably mounted on the reinforcing member 36' and base-plate 15'.

It can be seen that by the arrangement shown in Fig. III, not only a wide range of adjustment can be obtained but that the end positions of the sector can be independently secured by locating the stud members 70 and 71 at different radial distances with respect to the pivotal point 23' of the sector 25' whereby the corresponding stud will engage the transverse wall 53' or 54' at different radially disposed points. In this form of the invention, the displacement of the studs 70 and 71 with respect to the stationary plate can be readily carried out by manipulating the clamping means which are of the same type as those disclosed in the embodiment shown in Fig. II.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. A self-integrated window actuating mechanism comprising a base plate, an arm operatively connected to a window pane for moving the same into a predetermined position, a gear sector mounted on said plate and being connected to said arm to provide a speed reduction means, power operated means mounted on said plate for actuating said gear sector, a pin carried by said plate passing through an elongated slot formed in said sector providing a motion limiting connection between said gear sector and said base plate, and the length of said slot being arranged so that when the pin is brought into abutting engagement with the end of the slot the end position of the window pane is established by stalling the power means.

2. A self-integrated window actuating mechanism comprising a support, an arm operatively connected to a window pane for moving the same into a predetermined position, a gear sector mounted on said support being operatively connected to said arm, a motor for actuating said gear sector supported by said support, a pin and slot connection between said gear sector and said support forming a motion limiting means therebetween so constructed and arranged that the motor is stalled when the pin is brought into abutting engagement with the end of the slot determining thereby the end of the allowable travel of the window pane into its predetermined position, and yielding means carried by said pin to provide a cushioning stop for the stalling of the motor.

3. A unitary assembly for moving a part comprising a support, an arm operatively connected to the part for moving the same into a predetermined end position, a gear sector formed with spaced walls pivoted on said support and being connected to said arm, power means for actuating said gear sector, a stud adjustably carried by said support for abutting engagement with either of the spaced walls of said sector forming a motion limiting connection therebetween operable to stall the power means, an elongated aperture formed in said support for changing the radial distance of the stud from the pivotal point of the sector to change the extreme movement of said sector when the stud is brought into abutting engagement with either one of the spaced walls and thereby change the predetermined end position of said movable part determined by the stalling of the power means.

4. A self-integrated mechanism for moving a part comprising a support, a swinging arm associated with the part for moving the same into predetermined end positions, a gear sector for actuating said arm pivotally supported on said support, a plurality of pins carried by said support passing through a slot formed in said sector, said slot being arcuate and concentric with the pivotal point of said sector and of a predetermined length whereby the transverse walls of said slot are brought into abutting engagement with one of said pins upon a predetermined movement of said sector with respect to said support forming a motion limiting connection therebetween, and means formed in said support for changing the position of said pins with respect to the pivotal point of the sector for effecting a change in the predetermined end position of said part.

5. An actuating mechanism for moving a window pane into a predetermined end position comprising a support, a movable arm operatively connected to the window pane for moving the same into a predetermined position, a motor for actuating said arm carried by said support, said arm provided with a slot on a section adjacent said support, a plurality of pins carried by said support passing through said slot forming a motion limiting connection between said arm and said support, said slot having appreciable width and with its transverse end walls substantially parallel and being arranged so that said motor is stalled by the abutting engagement of one of said pins with the end walls of said slot to establish thereby the end position of said window pane, and means formed in said support enabling separate movement of said pins for effecting a fine degree of adjustment of the predetermined end position of said window pane.

6. An actuating mechanism comprising a base plate, a high speed electric motor having low deceleration torque resiliently mounted on said plate, the armature of said motor being of comparatively small diameter and having small peripheral mass, an arm connected to means operable to move a part into selected end positions, gearing mounted on said plate, a member gear operatively connected to said arm to move the same, another member gear driven by said armature shaft, the member gear connected to said arm having an elongated slot, and a stud carried by said plate projecting into said slot forming a motion limiting connection between said arm and gear having yielding means for dampening the noise produced by the abutting engagement of the stud with the ends of the slot for causing the stalling of the motor to thereby establish the end position of said part.

7. In an actuator for moving a part into a predetermined position, a relatively stationary support, a high speed electric motor characterized by having a small kinetic energy of rotation mounted on said support, the armature of said motor being of comparatively small diameter and having small peripheral mass, an output member associated with said part for moving the same into a predetermined position, a gear sector carried by said support providing a speed reduction means between said motor armature and said output member, a pin carried by said support passing through a slot formed in said sector forming a motion limiting connection between a member gear of said gear train and said support being constructed and arranged so that the motor armature is stalled when said pin is brought into abutting engagement with the end of said slot determining thereby the predetermined position of said part, cushioning means forming part of said motion limiting connection functioning as shock and noise dampening means upon the stalling of the motor armature, and said pin being adjustably carried by said support to change the extent of the relative movement between the said member gear and said supporting plate for effecting a change in the predetermined position of said part.

References Cited in the file of this patent
UNITED STATES PATENTS

| | | |
|---|---|---|
| 2,331,260 | Wiseman | Oct. 5, 1943 |
| 2,358,471 | Owens | Sept. 19, 1944 |
| 2,382,791 | Hill | Aug. 14, 1945 |
| 2,397,861 | Hoover | Apr. 2, 1946 |
| 2,588,880 | Richards | Mar. 11, 1952 |
| 2,714,699 | Bieber et al. | Aug. 2, 1955 |
| 2,718,395 | Ehrlich | Sept. 20, 1955 |